Jan. 18, 1927.
C. H. HITCHCOCK
1,614,553
STRAND GAUGE
Filed July 9, 1923
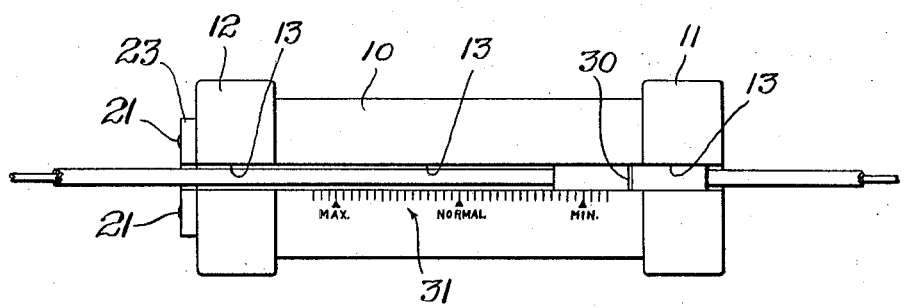
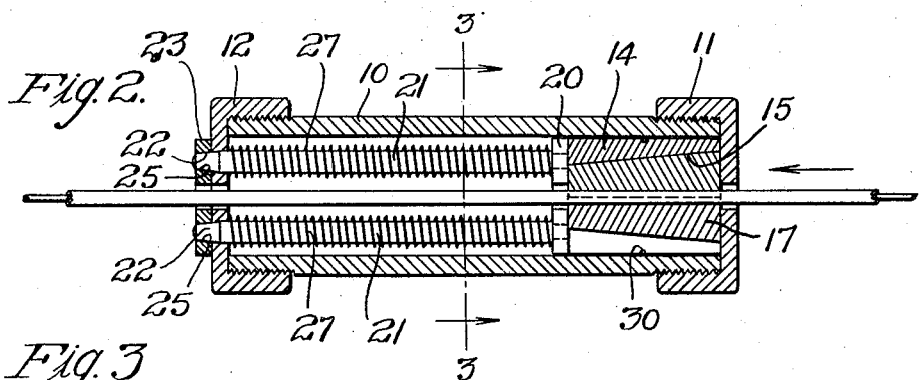
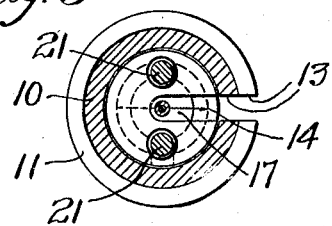
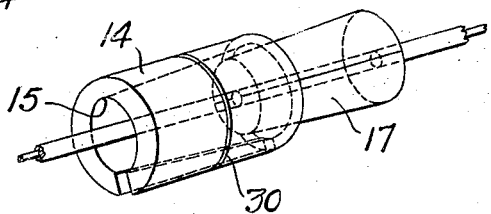
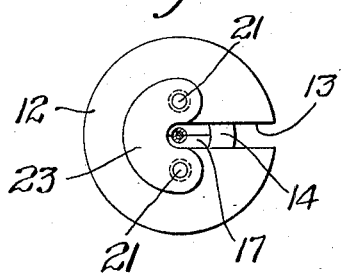
Inventor
Carl H. Hitchcock
by H. A. Patterson
Atty.

Patented Jan. 18, 1927.

1,614,553

UNITED STATES PATENT OFFICE.

CARL HUNTLEY HITCHCOCK, OF LA GRANGE, ILLINOIS, ASSIGNOR TO WESTERN ELECTRIC COMPANY, INCORPORATED, OF NEW YORK, N. Y., A CORPORATION OF NEW YORK.

STRAND GAUGE.

Application filed July 9, 1923. Serial No. 650,291.

This invention relates to strand gauges, and more particularly to a gauge for determining the diameter of insulated conductors of the pulp and ribbon insulated types used in the telephone art.

An object of the invention is to provide a gauge adapted to be placed over a strand and upon a relative movement therebetween to automatically indicate a measurement of the strand.

Another object of the invention is to provide a gauge adapted to be placed over a strand and upon a relative movement therebetween to indicate variations in a measurement of the strand.

A further object of the invention is to provide a gauge adapted to be placed over an insulated conductor and upon a relative movement therebetween to automatically indicate whether the diameter of the insulated conductor is normal or within certain prescribed maximum or minimum limits.

A still further object of the invention is to provide a gauge of the above mentioned type which may be placed over a moving insulated conductor as it leaves an insulating machine to measure any or all portions of the insulated wire without breaking the conductor or disturbing the insulation.

An additional object of the invention is to provide a gauge of the above mentioned type which is adapted to be readily changed or adjusted whereby strands or insulated conductors of various diameters, and in the case of the latter covered with insulation of varying degrees of compressibility, may be measured with equally efficient results.

A gauge made in accordance with the invention may comprise a casing or hand grip member within which is loosely mounted a sleeve, both the hand grip and sleeve being slotted longitudinally to permit their being placed over a strand. The sleeve is provided with a tapered bore within which is mounted a two part cone shaped friction sleeve or die adapted to encircle and frictionally engage the strand. The first-mentioned sleeve is retained in its normal position by suitable springs and moves against the action thereof in response to the friction encountered by the strand during relative movement therebetween. A circumferential marking upon the sleeve co-operating with a suitably calibrated scale upon the hand grip member indicates whether the diameter of the strand is normal or within the prescribed allowable limits.

These and other objects of the invention not specifically mentioned will clearly appear from the following description and the accompanying drawing, Fig. 1 of which shows a view, in elevation, of a gauge embodying the invention mounted on an insulated conductor;

Fig. 2 is a horizontal vertical sectional view thereof;

Fig. 3 is a section on the line 3—3 of Fig. 2 looking in the direction indicated by the arrows;

Fig. 4 is an end elevation, and

Fig. 5 is a perspective view showing the manner of mounting the sleeve and two part friction die on the insulated wire.

Referring to the drawing in detail, 10 represents a casing or hand grip member for supporting the movable parts of the gauge. Caps 11 and 12 are secured by screw threads to either end of the casing 10 for retaining the movable parts therein. The casing 10 and caps 11 and 12 are slotted, as indicated at 13, from end to end and from their peripheries to their axes as clearly shown in Figs. 1 and 4, for the purpose of mounting the gauge on the moving insulated wire as it leaves the insulating machine. The slot 13 is of suitable width to accommodate strands having diameters within a certain range. Fitted within the casing 10 and adapted to slide freely therein, is a sleeve 14 provided with a tapered bore 15 and also slotted from end to end so that it may be mounted on the moving conductor. Fitted within the tapered bore 15 of the sleeve 14 is a two part cone shaped die 17 which is shaped to closely fit the tapered bore 15 of the sleeve 14. The tapered bore of the sleeve 14 holds the two part die 17 in correct alignment, thereby holding the opening therein to a fixed diameter. Mounted to fit snugly within the bore of the casing 10, but freely slidable therein, is a disk 20 which is slotted in a manner and for the same purpose as the other slotted parts. Suitably secured to the disk 20 at diametrically opposite points are two pins 21 which at their opposite ends pass freely through suitable openings formed in the cap 12. The ends of the pins 21 which project through the cap 12 are tapered as indicated at 22 and enter suitable openings 25 formed in a U-shaped retaining plate 23. The openings 25 in the plate 23 are formed to grip tightly the tapered ends 22 of the pins, but not so tight that they may not be easily removed to allow the mounting of a different set of springs upon the pins as required, the reason for which will be explained hereafter.

Carried upon each of the pins 21 is a helical compression spring 27 which rests at one end against the inside of the cap 12 and at the opposite end against the disk 20. The springs 27 are adapted to be compressed when the sleeve 14 is moved in response to the friction encountered by the conductor in passing through the two part die. The direction of movement of the strand is indicated by an arrow in the drawings. A circumferential mark indicated at 30 upon the sleeve 14 cooperates with a scale indicated at 31 on the stationary casing 10. The scale 31 is calibrated to indicate by the movement of the mark 30 whether the conductor as it leaves the insulating machine is of the desired diameter, or within the maximum or minimum limits thereof.

The mounting of the gauge around the conductor is as follows:

The gauge is partially disassembled by removing the slotted cap 11 and withdrawing the sleeve 14 which carries the split die 17. The die is then removed and the slotted sleeve is mounted on the conductor by passing the conductor through the slot formed therein, after which a split die, the two members of which form a suitable opening for the conductor to be measured, is positioned therearound and moved lengthwise thereof and into the sleeve 14 as clearly shown in Fig. 5. The other members of the gauge carried by the slotted casing 10, comprising slotted cap 12, pins 21 mounting the springs 27 and the slotted disk 20 and plate 23 are then mounted around the conductor by passing the conductor through the slots formed in the various parts. The open end of the casing and the sleeve 14 are then brought together and the sleeve entered within the casing, after which the slotted cap 11 is mounted around the conductor and then moved into engagement with the casing 10 and threaded thereon. In mounting the sleeve 14 on the conductor, the small end of the tapered bore is positioned in the casing in the direction in which the conductor is moving so that the movement of the die 17 in response to the friction encountered by the conductor in passing therethrough will align it perfectly within the sleeve and cause it to move therewith.

The gauge may be used as a portable hand gauge to be mounted at intervals around a strand being manufactured or covered and held in position by an operator, or it may be carried by a suitable bracket, whereby it will at all times indicate a measurement or variations in a measurement of the strand.

The operation of the gauge is as follows:

After the mounting of the gauge upon the moving conductor the friction between the die and the conductor will cause the die to move, and with it the sleeve 14, and if the mark 30 thereon fluctuates consistently within a few of the scale markings at either side of the point marked "Normal" the insulated conductor is clearly of the desired diameter, or if the mark once in a while moves either to the point marked "Max." or "Min." the conductor is still considered as of the desired diameter. However, if the mark 30 fluctuates consistently near either of the points marked "Max." or "Min." the diameter of the insulated conductor is not within the prescribed limits.

The gauge is adapted to be changed or adjusted to accommodate strands or insulated conductors of various diameters and in the case of the latter, covered with insulation of varying degrees of compressibility. When an insulated conductor of larger or smaller diameter is to be measured, the two part die is removed and one with the required opening to suit the conductor to be measured is mounted in position. In the case of an easily compressible covering or insulation on the strand or conductor, which covering affords a better grip upon the die, the springs are changed and replaced by springs of less strength to compensate for the better grip of the conductor upon the die.

What is claimed is:

1. A strand gauge comprising a member adapted to engage all points of the periphery of a strand, means responsive to a relative longitudinal movement of the member and the strand to indicate a measurement of the strand, and yieldable means for resisting such movement.

2. A strand gauge comprising a casing, a die for the strand and mounted in the casing, said die movable within the casing in response to and parallel with the longitudinal movement of the strand engaged thereby, and resilient means for resisting such movement, said casing and die bearing cooperative markings for indicating a measurement of the strand in response to a relative movement of the die and the strand.

3. A strand gauge comprising a slotted casing, a split die for the strand and mounted in the casing, said slotted casing and split die adapted to be positioned around a strand intermediate the ends thereof, said die movable within the casing in response to and parallel with the longitudinal movement of the strand engaged thereby, and yieldable means for resisting such movement, said casing and die bearing markings cooperating responsive to a relative movement of the die and the strand to indicate a measurement of the strand.

4. A strand gauge comprising a member adapted to frictionally engage a strand, a support therefor, said support and said member bearing markings cooperating to indicate upon a relative longitudinal movement of said friction member and the strand whether the diameter of the strand is within certain prescribed limits, and yieldable means for resisting such movement.

5. A strand gauge comprising a split member adapted to be positioned in frictional engagement around a strand intermediate the ends thereof, a support therefor, said support and said member bearing markings cooperating to indicate upon a relative longitudinal movement of said friction member and the strand whether the diameter of the strand is within certain prescribed limits, and yieldable means for resisting such movement.

6. A strand gauge comprising a sleeve adapted to frictionally engage a strand, a support therefor, said support having a calibrated scale and said sleeve having a marking to cooperate with the scale to indicate upon a relative longitudinal movement of said sleeve and the strand whether the diameter of the strand is within certain prescribed limits, and yieldable means for resisting such movement.

7. A strand gauge comprising a split sleeve adapted to be positioned around and to frictionally engage a strand intermediate the ends thereof, a support therefor, said support having a calibrated scale and said sleeve having an index marking cooperating with the scale on the sleeve to indicate upon a relative longitudinal movement of said sleeve and the strand whether the diameter of the strand is within certain prescribed limits, and yieldable means for resisting such movement.

8. A strand gauge comprising a tapered split sleeve adapted to encircle and frictionally engage the periphery of a longitudinally moving strand, a slotted member adapted to be fitted around said tapered split sleeve, a support for said slotted member within which said member moves in response to the friction between the strand and split sleeve, and yieldable means between said support and slotted member adapted to resist the movement of the latter, said support and said slotted member bearing markings cooperating to indicate whether the diameter of the strand is within certain prescribed limits.

9. A gauge for measuring the diameter of a longitudinally moving strand, comprising a split sleeve adapted to frictionally engage the periphery of the strand, a slotted member fitting around said sleeve and adapted to retain the parts thereof in correct alignment, a support for said member upon which said member moves in response to the friction between the strand and split sleeve, and yieldable means associated with said support and slotted member adapted to resist the movement of the latter, said support and said slotted member bearing markings cooperating to indicate whether the diameter of the strand is within certain prescribed limits.

10. A strand gauge comprising a split member adapted to be positioned around and to frictionally engage a strand, a longitudinally moving sleeve positioned therearound adapted to align and hold the opening in said split member to a fixed diameter to frictionally engage the strand, a support therefor, and yieldable means between said support and sleeve adapted to resist the movement of said split member, said support and said split member bearing markings cooperating to indicate whether the diameter of the strand is within certain prescribed limits.

In witness whereof, I hereunto subscribe my name this 27th day of June A. D., 1923.

CARL HUNTLEY HITCHCOCK.